US012132957B2

(12) United States Patent
Tapse et al.

(10) Patent No.: US 12,132,957 B2
(45) Date of Patent: Oct. 29, 2024

(54) METHODS AND APPARATUS TO IDENTIFY STREAMING MEDIA SOURCES (71) Applicant: The Nielsen Company (US), LLC, New York, NY (US)

(72) Inventors: Sandeep Tapse, Oldsmar, FL (US); Jason Olmsted, Tampa, FL (US); James Petro, Dunedin, FL (US); Albert T. Borawski, Oldsmar, FL (US); Brian Fuhrer, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/153,875

(22) Filed: Jan. 12, 2023

(65) Prior Publication Data

US 2023/0247255 A1   Aug. 3, 2023

Related U.S. Application Data

(63) Continuation of application No. 17/181,988, filed on Feb. 22, 2021, now Pat. No. 11,558,661, which is a (Continued)

(51) Int. Cl.
*H04N 21/442* (2011.01)
*H04L 65/61* (2022.01)
(Continued)

(52) U.S. Cl.
CPC ....... *H04N 21/44204* (2013.01); *H04L 65/61* (2022.05); *H04L 65/65* (2022.05);
(Continued)

(58) Field of Classification Search
CPC ......... H04N 21/44204; H04N 21/4782; H04N 21/8352; H04N 21/23109; H04N 21/658;
(Continued)

(56) References Cited

U.S. PATENT DOCUMENTS 5,481,294 A   1/1996   Thomas et al.
7,886,068 B1  2/2011   Rao et al.
(Continued)

OTHER PUBLICATIONS all-streaming-media.com: "How to get the URL of a media stream," [http://all-streaming-media.com/faq/recording-media-stream/faq-get-media-stream-URL.com], retrieved on Aug. 30, 2016, 5 pages.
(Continued)

*Primary Examiner* — Nathan J Flynn
*Assistant Examiner* — Christine A Kurien (57) ABSTRACT

Methods, apparatus, systems and articles of manufacture to identify media sources are disclosed. Example apparatus disclosed herein include an exclusivity determiner, a unique asset identifier, and a signature matcher. The exclusivity determiner is to determine whether media is exclusive to a provider. The unique asset identifier is to associate a first signature of the media with the provider if the media is exclusive to the provider. The signature matcher is to identify the provider based on a second signature, the second signature matching the first signature, the second signature extracted from media presented at a media presentation location.

20 Claims, 6 Drawing Sheets

Related U.S. Application Data continuation of application No. 15/467,734, filed on Mar. 23, 2017, now Pat. No. 10,932,001.

(51) Int. Cl.
| | |
|---|---|
| *H04L 65/65* | (2022.01) |
| *H04N 21/231* | (2011.01) |
| *H04N 21/422* | (2011.01) |
| *H04N 21/4782* | (2011.01) |
| *H04N 21/658* | (2011.01) |
| *H04N 21/8352* | (2011.01) |
| *H04N 21/84* | (2011.01) |

(52) U.S. Cl.
CPC . *H04N 21/23109* (2013.01); *H04N 21/42203* (2013.01); *H04N 21/44224* (2020.08); *H04N 21/4782* (2013.01); *H04N 21/658* (2013.01); *H04N 21/8352* (2013.01); *H04N 21/84* (2013.01)

(58) Field of Classification Search
CPC ............. H04N 21/42203; H04N 21/84; H04N 21/44222; H04L 65/4069; H04L 65/608
See application file for complete search history.

(56) References Cited

U.S. PATENT DOCUMENTS

| | | | |
|---|---|---|---|
| 7,949,774 | B2 | 5/2011 | Kime et al. |
| 8,463,000 | B1 | 6/2013 | Kaminski, Jr. |
| 8,607,135 | B2 | 12/2013 | Sponheim et al. |
| 9,400,988 | B2 | 7/2016 | Napchi et al. |
| 10,932,001 | B2 | 2/2021 | Tapse et al. |
| 11,558,661 | B2 | 1/2023 | Tapse et al. |
| 2003/0061490 | A1 | 3/2003 | Abajian |
| 2007/0011040 | A1 | 1/2007 | Wright et al. |
| 2013/0007790 | A1 | 1/2013 | McMillan |
| 2014/0278845 | A1* | 9/2014 | Teiser .................. H04N 21/812 705/14.4 |
| 2016/0066005 | A1 | 3/2016 | Davis et al. |
| 2016/0094601 | A1 | 3/2016 | Besehanic |
| 2016/0094877 | A1* | 3/2016 | Heffernan .......... H04N 21/8352 725/19 |
| 2021/0176526 | A1 | 6/2021 | Tapse et al. |

OTHER PUBLICATIONS

Cranor, et al.: "Enhanced Streaming Services in a Content Distribution Network," IEEE Internet Computing, Jul.-Aug. 2001, 10 pages.

United States Patent and Trademark Office: "Notice of Allowance," mailed in connection with U.S. Appl. No. 15/467,734, on Oct. 15, 2020, 7 pages.

United States Patent and Trademark Office: "Final Rejection," mailed in connection with U.S. Appl. No. 15/467,734, on Apr. 16, 2020, 9 pages.

United States Patent and Trademark Office: "Non-Final Rejection," mailed in connection with U.S. Appl. No. 15/467,734, on Aug. 9, 2019, 9 pages.

United States Patent and Trademark Office: "Advisory Action," mailed in connection with U.S. Appl. No. 15/467,734, on Jun. 21, 2019, 3 pages.

United States Patent and Trademark Office: "Final Rejection," mailed in connection with U.S. Appl. No. 15/467,734, on Mar. 21, 2019, 9 pages.

United States Patent and Trademark Office: "Non-Final Rejection," mailed in connection with U.S. Appl. No. 15/467,734, on Aug. 16, 2018, 11 pages.

United States Patent and Trademark Office "Non-Final Rejection," mailed in connection with U.S. Appl. No. 17/181,988, on Apr. 15, 2022, 11 pages.

United States Patent and Trademark Office: "Notice of Allowance and Fee(s) Due," mailed in connection with U.S. Appl. No. 17/181,988, on Sep. 28, 2022, 7 pages.

* cited by examiner

METHODS AND APPARATUS TO IDENTIFY STREAMING MEDIA SOURCES

RELATED APPLICATIONS

This patent arises from a continuation of U.S. patent application Ser. No. 17/181,988, filed on Feb. 22, 2021, now U.S. Pat. No. 11,558,661, which is a continuation of U.S. patent application Ser. No. 15/467,734, filed on Mar. 23, 2017, now U.S. Pat. No. 10,932,001. Priority to U.S. patent application Ser. No. 17/181,988 and U.S. patent application Ser. No. 15/467,734 is claimed. U.S. patent application Ser. No. 17/181,988 and U.S. patent application Ser. No. 15/467,734 are hereby incorporated herein by reference in their respective entireties.

FIELD OF THE DISCLOSURE

This disclosure relates generally to monitoring media presentation, and, more particularly, to methods and apparatus to identify streaming media sources.

BACKGROUND

In recent years, presentation of media to users has been monitored and measured through the use of, for example, signatures for media identification. Media monitoring companies make reference signatures of identified media (e.g., television programs, music, audio broadcasts, internet videos, audio and/or visual advertisements, etc.), typically to develop a reference database. As unidentified media is presented to a user, a series of signatures of the unidentified media is made. The signatures of the unidentified media are then compared to the reference signatures. When the signatures of the unidentified media match one or more of the reference signatures, the unidentified media is identified.

BRIEF DESCRIPTION OF THE DRAWINGS

Wherever possible, the same reference numbers will be used throughout the drawing(s) and accompanying written description to refer to the same or like parts.

DETAILED DESCRIPTION

Audience measurement companies desire to gain knowledge regarding how users interact with client devices (e.g., televisions, handheld mobile devices, smartphones, laptop computers, tablets, etc.). For example, monitoring companies want to monitor media (e.g., television programs, music, Internet videos, etc.) that is presented on the client devices to, among other things, monitor exposure to advertisements, determine advertisement effectiveness, determine user behavior, identify purchasing behavior associated with various demographics, credit media consumption rates, etc. Some known systems have utilized meters coupled to client devices to generate signatures of the media that is presented on the client device. In some examples, the generated signatures are associated with respective timestamps of when the signatures were generated. The meter-generated signatures are then compared to a database of reference signatures to identify and thus monitor media being viewed and/or heard with the client device.

Signature or fingerprint-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

Example systems, methods, and apparatus disclosed herein collect, analyze, collate, and associate signatures of exclusive (e.g., distributed by one or a limited number of provider(s)) media. In some examples, media is publicly known (e.g., via advertising campaigns, press releases, news media, articles, etc.) to be distributed (e.g., broadcast) by a singular provider (e.g., the media is exclusive to the provider). In some examples, media is streaming media originating from a streaming service provider (e.g., HBO®, Hulu®, ABC®, etc.). In some examples, the media is presented via a network to an online device. In some such examples, a reference generator determines uniform resource locators of webpages presenting the media and generates signatures of the media. In some examples, media is identified via the uniform resource locators and associated with the signatures generated by the reference generator. In some such examples, the identified media is compared against a log of media publicly known to be exclusive to a provider. In some such examples, where the identified media match logged exclusive media, the signatures of the identified media are identified as unique assets. In some such examples, the unique asset signatures, the identified media, and the universal resource locators are associatively stored in a reference library. In some examples, the media is provided to the reference generator by a provider. In some such examples, the reference generator collects media information of the media (e.g., a title) and a provider identifier (e.g., a name of the provider) and generates a signature of the media. In some such examples, the media information is compared against the log of media publicly known to be exclusive to providers. In some such examples, where the identified media match logged exclusive media, the signatures associated with the media information are identified as unique assets. In some such examples, the unique asset signatures, the media information, and the provider are associatively stored in the reference library. In some examples, a collection facility generates references including media information, signatures, and unique asset identifiers based on media supplied by a provider. In some examples, media is presented on a non-online device (e.g., a television, radio, etc.). In some examples a media presentation meter generates signatures of the media. In some such examples, the signatures generated by the media presentation meter are compared to reference signatures in the reference library. In some such examples, where the signatures generated by the media presentation meter match reference signatures, the media is identified. In some such examples, where the reference signature is a unique asset, a provider of the identified media is identified. In such examples, presentation of the media may thus be credited to the media and/or the provider.

Figure 1:
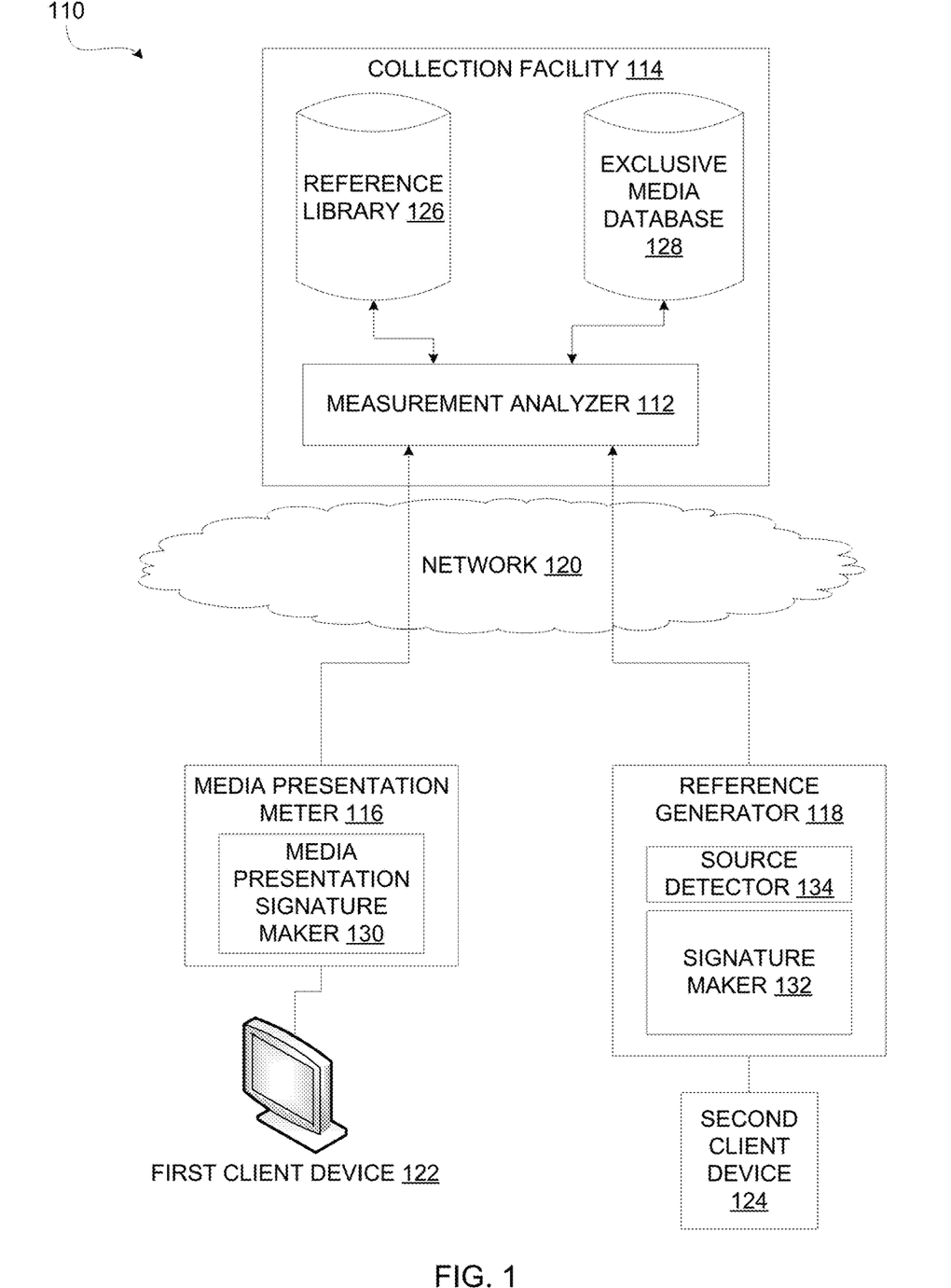
FIG. 1 is a block diagram of an example environment in which a measurement analyzer constructed in accordance with the teachings of this disclosure operates to monitor media presentation.

FIG. 1 is a block diagram of an example environment 110 in which a measurement analyzer 112 constructed in accordance with the teachings of this disclosure operates to monitor media presentation. The example environment includes a collection facility 114, a media presentation meter 116, a reference generator 118, a network 120 a first client device 122, and a second client device 124. In the illustrated example of FIG. 1, the first client device 122 is depicted as a television. The second client device 124 may be any hardware device (e.g., a mobile device, a computer, a television, an over-the-top stick, an over-the-top box, etc.). The example collection facility 114 includes the measurement analyzer 112, a reference library 126, and an exclusive media database 128. The example media presentation meter 116 includes a media presentation signature maker 130. The example reference generator 118 includes a signature maker 132 and a source detector 134.

The measurement analyzer 112 of the illustrated example of FIG. 1 determines whether media presented on the second client device 124, media provided to the reference generator 118, and or media provided to the collection facility 114 is exclusive to a provider of the media. The measurement analyzer 112 associatively stores media information, a signature of the media, and an exclusivity determination in the example reference library 126. In other words, the measurement analyzer 112 generates new reference library entries with unique asset labels. The measurement analyzer 112 credits non-exclusive media presented on the first client device 122 (e.g., a number of presentation views for media available via multiple providers). The measurement analyzer 112 credits exclusive media and respective providers of the exclusive media when the exclusive media is presented on the first client device 122 (e.g., the measurement analyzer 112 tallies presentation views for both exclusive media and for unique providers). The measurement analyzer 112 may be implemented by one or more processors included in one or more computers (e.g., servers) housed in the collection facility 114. The collection facility 114 may be a central building and/or multiple sites interconnected via the network 120. An example implementation of the measurement analyzer 112 is described in conjunction with FIG. 2.

The media presentation meter 116 of the illustrated example of FIG. 1 generates signatures of media presented on the first client device 116. The media presentation meter 116 may include one or more audio recording devices (e.g., a microphone, a memory, a processor, a tape recorder, etc.) to record audio output of a non-online device (e.g., the first client device 116). The media presentation signature maker 130 may include a processor and/or a memory to generate signatures from the recorded audio output.

In some examples, the reference generator 118 of the illustrated example of FIG. 1 generates signatures of media presented on the second client device 124 and extracts media information via webpages on which the media is presented and/or metadata of the media. The reference generator 118 may include one or more audio recording devices and/or one or more processors to record audio signals (e.g., output, electrical signals of recorded sounds, etc.) of an online device (e.g., the second client device 124). The source detector 134 may include one or more processors to detect a uniform resource locator (URL) of a webpage visited by the online device, metadata of the media (e.g., file names, file sizes, headers, meta tags, media production equipment, media production date, media production software, etc.), and/or a direct media data submission (e.g., by a provider to the audience measurement company). Additionally or alternatively, the source detector 134 may extract the metadata of the media presented from the webpage visited by the online device. The signature maker 132 may include a processor and/or a memory to generate signatures from the recorded audio signals. In the illustrated example, the terms "media," "media information," "media metadata," "media title," "provider," "audio signals," "uniform resource locator," "URL," "webpage(s)," and source data refer to information, names, and/or identifiers that are publicly available (e.g., open to the general public, accessible, known, etc.).

The first client device 122 of the illustrated example is in communication with the media presentation meter 116. The media presentation signature maker 130 generates signatures of the media presented on the first client device 122. The media presentation meter 116 is in communication with the measurement analyzer 112 via the network 120. The media presentation meter 116 provides signatures generated by the media presentation signature maker 130 to the measurement analyzer 112.

The second client device 124 of the illustrated example presents media (e.g., streaming media) obtained via webpages (not shown in FIG. 1). In some examples, the second client device 124 reads media provided by a provider (e.g., via an encoded disc, an electronic memory storage device, an electronic upload, etc.) The second client device 124 is in communication with the reference generator 118. The source detector 134 detects URLs of the webpages, media metadata, and/or provider-supplied media information. The signature maker 132 generates signatures of the media presented on the second client device 124. The reference generator 118 is in communication with the measurement analyzer 112. The reference generator 118 provides the URLs, media metadata, and/or provider-supplied media information to the measurement analyzer 112. The reference generator 118 provides the signatures generated by the signature maker 132 to the measurement analyzer 112.

The reference library 126 of the illustrated example of FIG. 1 stores reference signatures generated from known media and corresponding media information and/or providers. The reference library 126 may be implemented by one or more processors and/or memory included in one or more computers housed in the collection facility 114. An example implementation of the reference library 126 is described in conjunction with FIG. 5.

The exclusive media database 128 stores publicly known media information of media publicly known to be exclusive to particular providers and the corresponding providers (e.g., a title of a program available only from one provider and the name of the provider). The exclusive media database 128 may be compiled by examining a provider's public statements (e.g., advertising campaigns, press releases, articles, etc.) regarding media distributed by the provider. The exclusive media database 128 may be implemented by one or more processors and/or memory included in one or more computers housed in the collection facility 114. An example implementation of the exclusive media database 128 is described in conjunction with FIG. 5.

The example reference library 126 and/or the example exclusive media database 128 may be implemented by one or more databases, files, data structures, physical storage devices, etc.

The measurement analyzer 112 is in communication with the reference library 126 and with the exclusive media database 128. The measurement analyzer 112 searches the exclusive media database 128 to determine whether the media presented on and/or provided to the second client device 124 is exclusive to a provider. The measurement analyzer 112 identifies signatures generated by the signature maker 132 as unique assets when the media presented on the second client device is exclusive to the provider. The measurement analyzer 112 stores the unique asset-identified signatures. The measurement analyzer 112 compares the signatures generated by the first client device 122 to signatures in the reference library 126. The measurement analyzer 112 credits the media and/or the provider when signatures generated by the first client device 122 match the unique asset-identified second signatures in the reference library 126.

Figure 2:
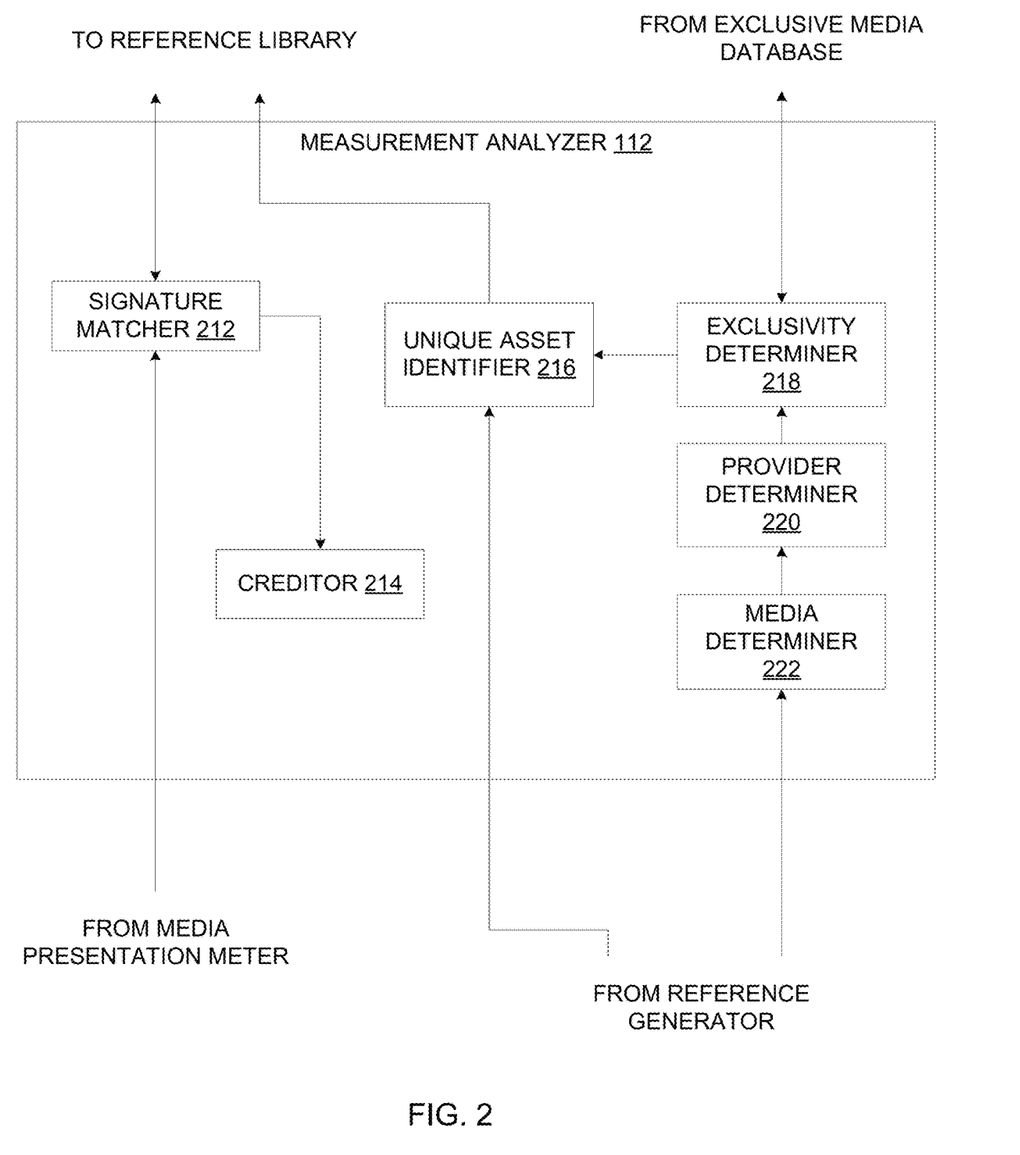
FIG. 2 is a block diagram of an example implementation of the example measurement analyzer of FIG. 1.

FIG. 2 is a more detailed block diagram of an example implementation of the example measurement analyzer 112 of FIG. 1. The measurement analyzer 112 of FIG. 2 includes a signature matcher 212, a creditor 214, a unique asset identifier 216, an exclusivity determiner 218, a provider determiner 220, and a media determiner 222.

The media determiner 222 of the illustrated example receives URLs, media metadata, and/or provider-supplied media data from the reference generator 118 of FIG. 1. The media determiner 222 determines (e.g., extracts, reads, locates, etc.) media information (e.g., a title, a season number, an episode number, etc.) of the media presented on the second client device 124 based on the URLs, the media metadata, and/or the provider-supplied media data. In some examples, the media determiner 222 may search for separating characters and/or phrases (e.g., "/," ".com," ".net," ":," "http," etc.) and/or identifying keywords (e.g., "title," "episode," "ttl," "ep," "s," "season," etc.) to parse the media information from the URL. Additionally or alternatively, the media determiner 222 may visit the webpage corresponding to the URL to extract metadata and/or to parse the media information. Additionally or alternatively, the media determiner 222 determines the media information based on the metadata received from the reference generator 118. Additionally or alternatively, the media determiner 222 parses the media information from the provider-supplied media data received from the reference generator 118. Additionally or alternatively, the reference generator 118 parses the URL and/or metadata to provide the media information to the media determiner 222.

The example provider determiner 220 is in communication with the media determiner 222. The provider determiner 220 receives the URLs, the media metadata, and/or the provider-supplied media data from the media determiner 222. The provider determiner 220 also receives the determined media information from the media determiner 222. The provider determiner determines (e.g., extracts, reads, locates, etc.) providers (e.g., broadcasters, streaming services, online video channels etc.) of the media presented on the second client device 124 based on the URL, the media metadata, and/or the provider-supplied media data. In some examples, the provider determiner 220 may search for the separating characters and/or phrases, the identifying keywords, and/or names of known providers to parse providers from the URL. Additionally or alternatively, the provider determiner 222 may visit the webpage corresponding to the URL to extract metadata and/or parse the provider. Additionally or alternatively, the provider determiner 220 determines the provider based on metadata received from the reference generator 118. Additionally or alternatively, provider determiner 220 parses the provider from the provider-supplied media data received from the reference generator 118. Additionally or alternatively, the reference generator 118 parses the URL and/or metadata to provide the provider to the provider determiner 220.

The example exclusivity determiner 218 is in communication with the provider determiner 220. The exclusivity determiner 218 receives the URLs, the media metadata, and/or the provider-supplied media data from the provider determiner 220. The exclusivity determiner 218 also receives the determined media information, and the determined providers from the provider determiner 220. The exclusivity determiner 218 is in communication with the exclusive media database 128 of FIG. 1. The exclusivity determiner 218 compares the media information to the exclusive media database 128 to determine whether the media presented on the second client device 124 is exclusive to the determined providers. The exclusive media database 128 includes entries of media publicly known to be exclusive to providers and the corresponding providers. The exclusivity determiner 218 searches the exclusive media database 128 for an entry matching the media information. When the exclusivity determiner 218 finds a matching entry in the exclusive media database 128, the media information under analysis is exclusive to the determined provider and the exclusivity determiner 218 makes an affirmative exclusivity determination. When the exclusivity determiner 218 does not find a matching entry in the exclusive media database 128, the media information under analysis is not exclusive to the determined provider and the exclusivity determiner 218 makes a negative exclusivity determination.

The example unique asset identifier 216 receives the signatures generated by the reference generator 118 of FIG. 1. The unique asset identifier 216 is in communication with the exclusivity determiner 218. The unique asset identifier 216 receives exclusivity determinations (e.g., yes or no) of the media presented on the second client device 124, the media information, and the providers, from the exclusivity determiner 218. The unique asset identifier 216 also receives the URLs, the media metadata, and/or the provider-supplied media data from the exclusivity determiner 218. The unique asset identifier 216 associatively stores the signatures generated by the reference generator 118, the media information, the providers, the exclusivity determinations, the URLs, the media metadata, and/or the provider-supplied media data in the reference library 126 of FIG. 1.

The example signature matcher 212 receives the signatures generated by the media presentation meter 116 of FIG. 1. The signature matcher 212 is in communication with the reference library 126 of FIG. 1. The signature matcher 212 compares the signatures generated by the media presentation meter 116 of FIG. 1 to reference signatures in the reference library to identify the media and/or providers of the media presented on the first client device 122 of FIG. 1.

The creditor 214 is in communication with the signature matcher 212. The creditor 214 receives identification of the providers and the identified media presented on the first client device 122 from the signature matcher 212. The creditor 214 counts (e.g., credits) presentation instances for the identified media presented on the first client device 122 and for the providers of the identified media presented on the first client device 122.

In operation, in some examples, a first user views media presented on a webpage via the second client device 124. In some such examples, while the first user views the media, the example reference generator 118 of FIG. 1 detects a URL of the webpage and/or media metadata and generates a first signature of the media. In operation, in some examples, a provider submits media and corresponding media data directly to the second client device 124. In operation, in some such examples, the reference generator 118 detects the provider-supplied media data and generates the first signature of the media.

In operation, the example reference generator 118 sends the URL, the media metadata, and/or the provider-supplied media data to the collection facility 114. In operation, the example reference generator 118 sends the signature to the collection facility 114.

In operation, the example media determiner 222 receives the URL the media metadata, and/or the provider-supplied media data from the reference generator 118 of FIG. 1. The media determiner 222 analyzes the URL the media metadata, and/or the provider-supplied media data to determine media information of the media presented on and/or read by the second client device 124.

In operation, the example provider determiner 220 receives the URL, the media metadata, and/or the provider-supplied media data and the determined media information from the media determiner 222. The provider determiner 222 analyzes the URL, the media metadata, and/or the provider-supplied media data to determine a provider of the media.

In operation, the example exclusivity determiner 218 receives the determined media information, and the determined provider, from the provider determiner 220. In operation, the example exclusivity determiner 218 also receives the URL, the media metadata, and/or the provider-supplied media data from the provider determiner 220. The exclusivity determiner 218 compares the media information to entries in the exclusive media database 128 of FIG. 1. The exclusivity determiner 218 makes an exclusivity determination based on the comparison.

In operation, the example unique asset identifier 216 receives the first signature of the media viewed by the user from the reference generator 118 of FIG. 1. In operation, the unique asset identifier 216 also receives the media information, the provider, and the exclusivity determination from the exclusivity determiner 218. In operation, the unique asset identifier 216 also receives the URL, the media metadata, and/or the provider-supplied media data from the exclusivity determiner 218. The unique asset identifier 216 associatively stores the first signature, the media information, the provider, the exclusivity determination, the URL, the media metadata, and/or the provider-supplied media data in the reference library 126 of FIG. 1.

In other words, in operation in a learning mode, the media analyzer 112 generates new reference signature entries having exclusivity determinations for the reference library 126 of FIG. 1 based on information from the second client device 124. In operation in an analysis mode, described below, the media analyzer 112 credits media presented on the first client device 122 of FIG. 1 based on a signature match between the media and a reference signature and credits the provider of the media based on the exclusivity determination of the reference signature.

In operation, a second user views media presented via the first client device 122. While the second user views the media, the media presentation meter 116 of FIG. 1 generates a second signature of the media.

In operation, the signature matcher 212 receives the second signature from the media presentation meter 116 of FIG. 1. The signature matcher 212 compares the second signature to signatures in the reference library 126 of FIG. 1 (e.g., the first signature). The signature matcher 212 makes a match determination (e.g., yes, no, match, no match, etc.) based on the comparison between the second signature and the signatures of the reference library 126 of FIG. 1. When the signature matcher 212 makes an affirmative match determination (e.g., yes, match, etc.), the signature matcher 212 retrieves media information and the exclusivity determination associated with the matched signature (e.g., the first signature). When the exclusivity determination associated with the matched signature is affirmative, the signature matcher 212 retrieves the provider associated with the matched signature. When the exclusivity determination associated with the matched signature is negative, the signature matcher 212 does not retrieve the provider associated with the matched signature.

In other words, when media publicly known to be exclusive to a provider is detected, the provider associated with the media presentation can be determined by the example signature matcher 212.

In operation, the creditor 214 receives the media information and, depending on the exclusivity determination associated with the media information, the provider from the signature matcher 212. The creditor 214 credits presentation of the media viewed by the second user according to the media information. When the creditor 214 receives the provider from the signature matcher 212, the creditor 214 additionally credits presentation of the media viewed by the second user according to the provider.

While an example manner of implementing the measurement analyzer of FIG. 1 is illustrated in FIG. 2, one or more of the elements, processes and/or devices illustrated in FIG. 2 may be combined, divided, rearranged, omitted, eliminated and/or implemented in any other way. Further, the signature matcher 212, the example creditor 214, the example unique asset identifier 216, the example, exclusivity determiner 218, the example provider determiner 220, the example media determiner 222, and/or, more generally, the example measurement analyzer 112 of FIG. 1 may be implemented by hardware, software, firmware and/or any combination of hardware, software and/or firmware. Thus, for example, any of the example the signature matcher 212, the example creditor 214, the example unique asset identifier 216, the example, exclusivity determiner 218, the example provider determiner 220, the example media determiner 222, and/or, more generally, the example measurement analyzer 112 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example signature matcher 212, the example creditor 214, the example unique asset identifier 216, the example, exclusivity determiner 218, the example provider determiner 220, the example media determiner 222 is/are hereby expressly defined to include a tangible computer readable storage device or storage disk such as a memory, a digital versatile disk (DVD), a compact disk (CD), a Blu-ray disk, etc. storing the software and/or firmware. Further still, the example measurement analyzer 112 of FIG. 1 may include one or more elements, processes and/or devices in addition to, or instead of, those illustrated in FIG. 2, and/or may include more than one of any or all of the illustrated elements, processes and devices.

Figure 3:
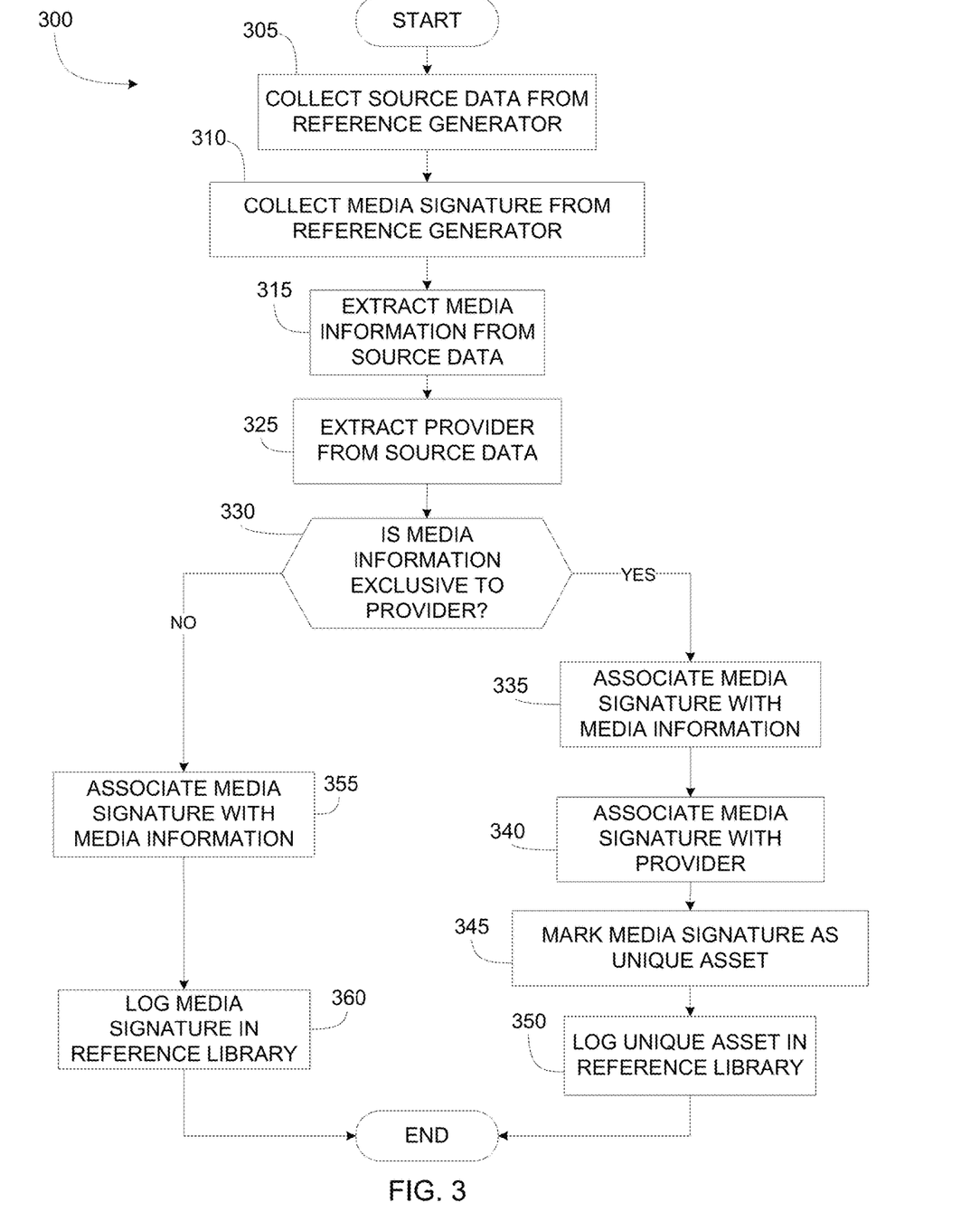
FIG. 3 is a flowchart representative of example machine-readable instructions that may be executed to determine unique assets with the example measurement analyzer of FIGS. 1-2.
Figure 4:
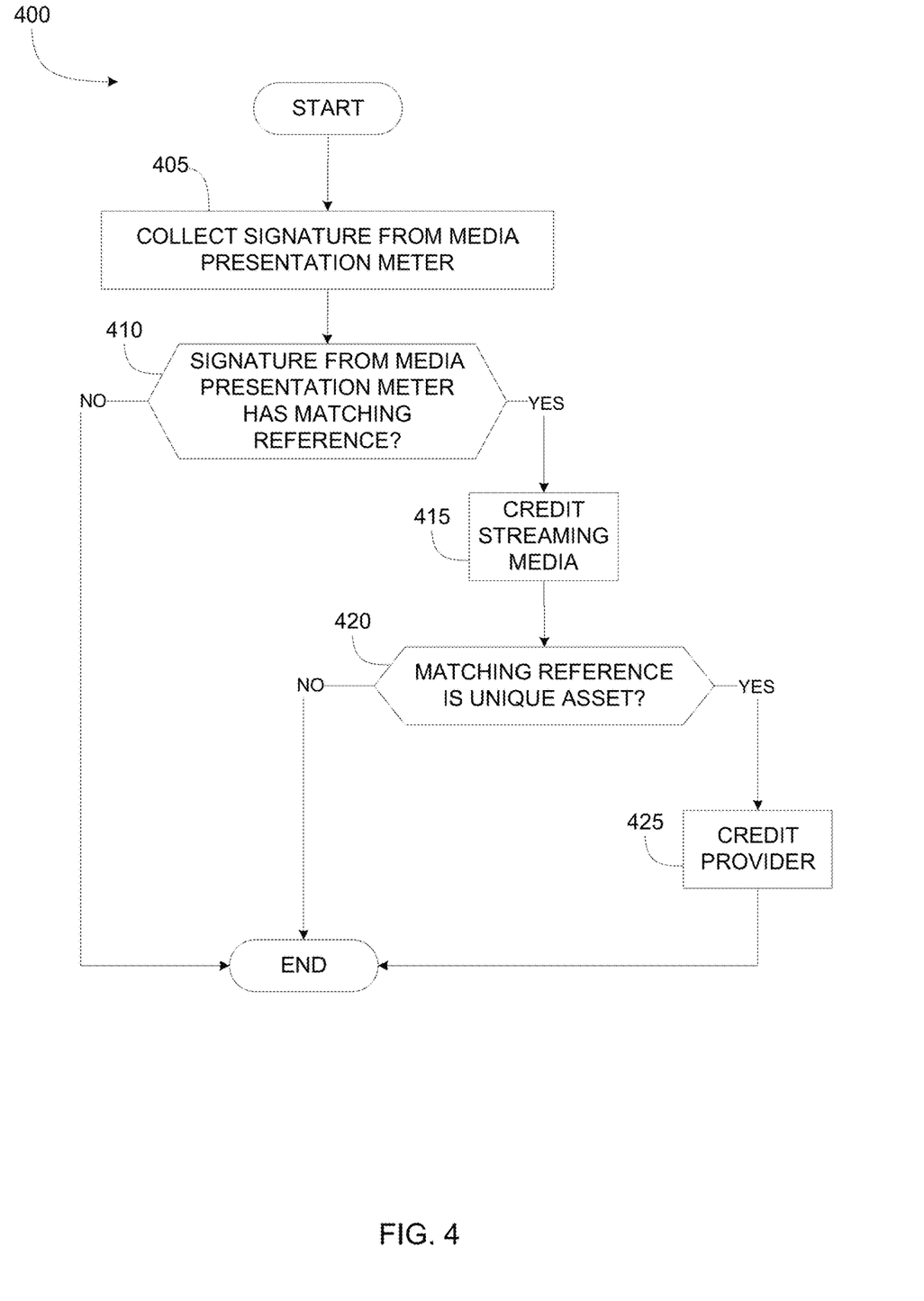
FIG. 4 is a flowchart representative of example machine-readable instructions that may be executed to credit providers of exclusive media with the example measurement analyzer of FIGS. 1-2.

Flowcharts representative of example machine readable instructions for implementing the measurement analyzer 112 of FIG. 2 are shown in FIGS. 3-4. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3-4, many other methods of implementing the example measurement analyzer 112 may alternatively be used. For example, the order of execution of the blocks may be changed, and/or some of the blocks described may be changed, eliminated, or combined.

As mentioned above, the example processes of FIGS. 3-4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is a flowchart representative of example machine-readable instructions 300 that may be executed to implement the example measurement analyzer of FIGS. 1 and/or 2 to determine unique asset reference signatures.

To start, the measurement analyzer 112 of FIG. 2 collects source data (e.g., a URL, media metadata, provider-supplied media information) of media presented on and/or provided to the second client device 124 (e.g., streaming media to be presented via a network) from the source detector 134 of FIG. 1 (block 305). Next, measurement analyzer 112 of collects a signature for the media from the signature maker 132 of FIG. 1 (block 310). Then, media determiner 222 of the measurement analyzer 112 determines media information (e.g., a media title, a season number, an episode number, etc.) of the media from the source data (block 315). Next, the provider determiner 220 of the measurement analyzer 112 determines a provider (e.g., a streaming service, an online video channel, etc.) of the media from the source data (block 320). Then, the exclusivity determiner 218 of the measurement analyzer 112 determines whether the media is exclusive to the provider (block 330).

If the media is exclusive to the provider (block 330), the unique asset identifier 216 of the measurement analyzer 112 of FIG. 2 associates the signature of the media with the media information (block 335). Then, the unique asset identifier 216 associates the signature of the media with the provider (block 340). Then, the unique asset identifier 216 marks (e.g., identifies, notates, etc.) the signature of the media associated with the provider as a unique asset (block 345). Next, the unique asset identifier 216 logs (e.g., stores, puts into memory, etc.) the unique asset-marked signature in the reference library 126 of FIG. 1 (block 350). The instructions 300 then end.

If the media is not exclusive to the provider (block 330), the unique asset identifier 216 associates the signature of the media with the media information (block 355). Then, the unique asset identifier 216 logs the signature in the reference library 126 of FIG. 1 (block 360). The instructions 300 then end.

FIG. 4 is a flowchart representative of example machine-readable instructions 400 that may be executed to implement the example measurement analyzer 112 of FIGS. 1 and/or 2 to credit providers of exclusive media.

To start, the example measurement analyzer 112 collects a signature generated by the media presentation signature maker 130 of FIG. 1 from the media presentation meter 116 of FIG. 1 (block 405). Then, the example signature matcher 212 of the example measurement analyzer 112 of FIG. 2 determines whether the signature from the media presentation meter has a matching reference in the reference library 126 of FIG. 1 (block 410).

If the signature from the media presentation meter has a matching reference in the reference library 126 of FIG. 1 (block 410), the example creditor 214 of the measurement analyzer 112 of FIG. 2 credits a presentation to the media associated with the matching signature (block 415). Then, the example signature matcher 212 of FIG. 2 determines whether the matching reference is a unique asset (block 420).

If, the matching reference is a unique asset, the example creditor 214 credits a presentation of the media to the provider associated with the unique asset matching reference (block 425).

If the signature from the media presentation meter 116 does not have a matching reference in the reference library 126 of FIG. 1 (block 410), the instructions 400 end.

Figure 5:
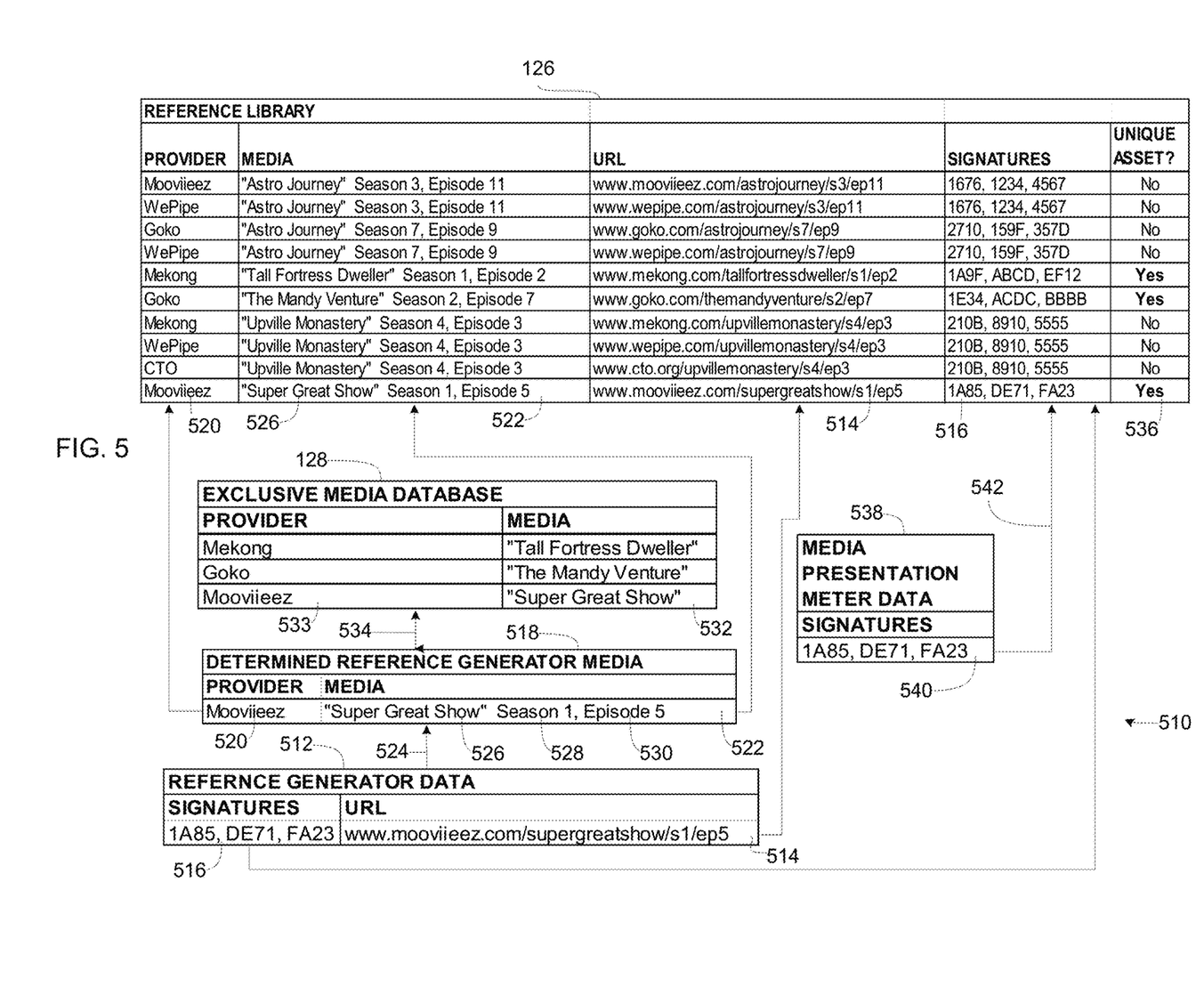
FIG. 5 illustrates an example technique utilized by the measurement analyzer of FIGS. 1-2 to monitor media presentation.

FIG. 5 illustrates an example technique 510 utilized by the measurement analyzer 112 of FIGS. 1-2 to monitor media presentation. In the illustrated example of FIG. 5, example technique 510 analyzes URLs to monitor media presentation. However, media metadata and/or provider-supplied media data may also be analyzed to monitor media presentation. According to the example of FIG. 5, example reference generator data 512 includes an example URL 514 "www.mooviieez.com/supergreatshow/s1/ep5" and an associated example first signature 516 "1A85, DE71, FA23" (e.g., representative of media presented on the second client device 124 and monitored by the reference generator 118 of FIG. 1.).

According to the example of FIG. 5, example determined reference generator data 518 includes an example provider 520 "Mooviieez" and associated example media information 522 determined from the URL 514 (e.g., respectively using the provider determiner 220 of FIG. 2 and the media determiner 222 of FIG. 2), as denoted by a first arrow 524. The example media information 522 include an example media title 526 "Super Great Show," an example season number indicator 528 "Season 1," and an example episode number indicator 530 "Episode 5."

In the example of FIG. 5, an example implementation of the exclusive media database 128 of FIG. 1 is shown in greater detail. According to the example of FIG. 5, the example media title 526 matches an example exclusive media title 532 "Super Great Show" that is exclusively distributed by an example exclusive media provider 533 identified in the exclusive media database 128 (e.g., using the exclusivity determiner 218 of FIG. 2), as denoted by a second arrow 534. Matching between the example media title 526 and the example exclusive media title 532 indicates that media (e.g., presented using the second client device 124 of FIG. 1) associated with the example media title 526 is exclusive to the example provider 520.

In the example of FIG. 5, an example implementation of the reference library 126 of FIG. 1 is shown in greater detail. According to the example of FIG. 5, the example provider 520, the example media information 522, the example URL 514, the example first signature 516, and an example exclusivity determination 536 are associatively stored in the reference library 126 (e.g., using the unique asset identifier 216 of FIG. 2). Other associated example providers, media information, URLs, signatures, and exclusivity determinations for other media are also shown in the reference library 126 in FIG. 5. In the example of FIG. 5, the exclusivity determination 536 is "Yes" because the example media title 526 "Super Great Show" matches the example exclusive media title 532 "Super Great Show" and is thus exclusive to the example provider 520 "Mooviieez." Thus, the first signature 516 associated with the example media title 526 is a unique asset.

According to the example of FIG. 5, example media presentation meter data 538 includes an example second signature 540 "1A85, DE71, FA23" (e.g., representative of media presented on the first client device 122 of FIG. 1 and monitored by the media presentation meter 116 of FIG. 1).

According to the example of FIG. 5, the example second signature 540 matches the first example signature 516 in the reference library 126, as denoted by a third arrow 542. Matching (e.g., determined using the signature matcher 212 of FIG. 2) between the first and second example signatures 516, 540 indicates that the media represented by the first signature 516 is the media represented by the second signature 540. Thus, because the media represented by the first signature 516 is known to be exclusive to the example provider 520, the signature matcher 212 determines that the media represented by the second signature 540 originated from the example provider 520. Thus, presentation of the media represented by the second signature 540 may specifically be credited to the example provider 520.

Figure 6:
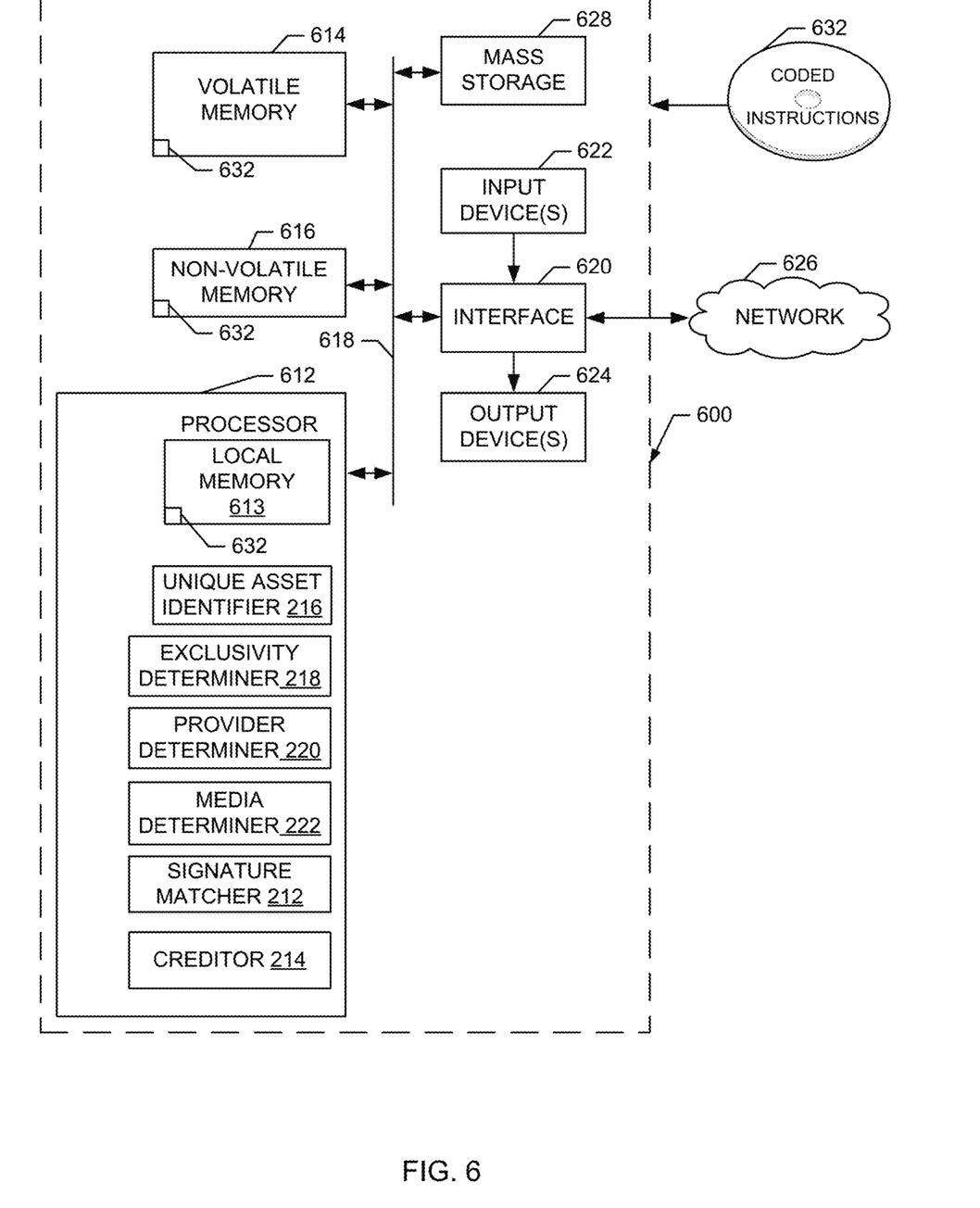
FIG. 6 is a block diagram of an example processor platform capable of executing the instructions of FIGS. 3 and/or 4 to implement the example measurement analyzer of FIGS. 1-2.

FIG. 6 is a block diagram of an example processor platform 600 capable of executing the instructions of FIGS. 3-4 to implement the measurement analyzer 112 of FIGS. 1-2. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache), the example signature matcher 212, the example creditor 214, the example unique asset identifier 216, the example exclusivity determiner 218, the example provider determiner 220, and the example media determiner 222. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 3-4 may be stored in the mass storage device 628, in the volatile memory 614, in the non-volatile memory 616, and/or on a removable tangible computer readable storage medium such as a CD or DVD.

From the foregoing, it will be appreciated that the above disclosed methods, apparatus and articles of manufacture may aid in identifying, analyzing, comparing, and understanding media and when that media is presented. By identifying signatures as exclusively originating from a particular provider, media may be more quickly identified, which in turn may provide insights into the preferences and habits of media consumers. Further, by determining exclusivity of signatures to particular providers from network data, media presented via non-network devices may be identified as originating from a particular provider without supplementary identifiers (e.g., a watermark). Identification of the media presented via non-network devices may thus be accomplished in fewer operations by a processor, thus reducing processor demand in a computer, as compared to analyzing supplementary identifiers plus signatures of media presented via non-network devices. Moreover, analyzing network data to determine exclusivity of signatures to particular providers may make reference signature generation more efficient. Learning about media consumers' preferences and habits may help media broadcasters to provide media (e.g., music, movies, television programs, etc.) that media consumers want to hear and to additionally deliver targeted advertisements for products that may interest media consumers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. A computing system comprising:
a processor; and
a non-transitory computer-readable storage medium, having stored thereon program instructions that, upon execution by the processor, cause performance of a set of operations comprising:
determining that first media is exclusive to a streaming media provider based on an associated universal resource locator ("URL") of the first media, metadata of the first media, or data provided by the streaming media provider about the first media;
associating a first signature of the first media with the streaming media provider based on the first media being exclusive to the provider; and
when a second signature of second media matches the first signature, identifying the streaming media provider as a provider of the second signature.

2. The computing system of claim 1, wherein the operations further comprising
identifying the first media based on source data collected from a reference generator; and
identifying the streaming media provider based on the source data.

3. The computing system of claim 2, wherein the source data includes at least one of the associated URL of the first media, the metadata of the first media, or the data provided by the streaming media provider about the first media.

4. The computing system of claim 1, wherein the operations further comprising:
marking the first signature associated with the streaming media provider as a unique asset.

5. The computing system of claim 1, wherein the second signature is generated by a media presentation meter.

6. The computing system of claim 1, wherein the second signature was extracted during presentation of the media at the media presentation location.

7. The computing system of claim 1, wherein the operations further to comprising:
logging the first signature associated with the streaming media provider in a reference library.

8. The computing system of claim 1, wherein the operations further comprising:
searching an exclusive media database of the first media previously identified as exclusive to determine whether first media is exclusive to a provider.

9. A method comprising:
determining that first media is exclusive to a streaming media provider based on an associated universal resource locator ("URL") of the first media, metadata of the first media, or data provided by the streaming media provider about the first media;
associating a first signature of the first media with the streaming media provider based on the first media being exclusive to the provider; and
when a second signature of second media matches the first signature, identifying, the streaming media provider as a provider of the second signature.

10. The method of claim 9, further comprising collecting, the first signature and source data of the first media from a reference generator; and
identifying the first media and the streaming media provider based on the source data.

11. The method of claim 10, wherein the source data includes at least one of the associated URL, the metadata of the first media, or the data provided by the streaming media provider about the first media.

12. The method of claim 9, further including marking the first signature associated with the streaming media provider as a unique asset.

13. The method of claim 9, wherein the second signature is generated by a media presentation meter.

14. The method of claim 9, wherein the second signature was extracted during presentation of the media at the media presentation location.

15. The method of claim 9, further including logging the first signature associated with the provider in a reference library.

16. The method of claim 9, wherein the determining that the first media is exclusive to a streaming media provider includes searching an exclusive media database of the first media previously identified as exclusive.

17. A non-transitory tangible computer readable storage medium comprising computer readable instructions which, when executed, cause a processor to at least:

determine that first media is exclusive to a streaming media provider based on an associated universal resource locator ("URL") of the first media, metadata of the first media, or data provided by the streaming media provider about the first media;

associate a first signature of the first media with the streaming media provider based on the first media being exclusive to the provider; and when a second signature of second media matches the first signature, identify the streaming media provider as a provider of the second signature.

18. The non-transitory computer readable storage medium as defined in claim 17, further including instructions to collect the first signature and source data of the first media from a reference generator; and identify the first media and the streaming media provider based on the source data.

19. The non-transitory computer readable storage medium as defined in claim 18, wherein the source data includes at least one of the associated URL, the metadata of the first media, or the data provided by the streaming media provider about the first media.

20. The non-transitory computer readable storage medium as defined in claim 17, further including instructions to mark the first signature associated with the streaming media provider as a unique asset.

\* \* \* \* \*